(12) United States Patent
Torri

(10) Patent No.: US 11,466,982 B2
(45) Date of Patent: Oct. 11, 2022

(54) METHOD AND APPARATUS FOR MEASURING THE DIMENSIONS AND CHARACTERISTIC ANGLES OF WHEELS, STEERING SYSTEM AND CHASSIS OF VEHICLES

(71) Applicant: CEMB S.P.A., Mandello del Lario (IT)

(72) Inventor: Giancarlo Torri, Mandello del Lario (IT)

(73) Assignee: CEMB S.P.A., Mandello del Lario (IT)

( * ) Notice: Subject to any disclaimer, the term of this patent is extended or adjusted under 35 U.S.C. 154(b) by 324 days.

(21) Appl. No.: 16/619,230

(22) PCT Filed: Nov. 26, 2018

(86) PCT No.: PCT/EP2018/082509
§ 371 (c)(1),
(2) Date: Dec. 4, 2019

(87) PCT Pub. No.: WO2019/101986
PCT Pub. Date: May 31, 2019

(65) Prior Publication Data
US 2020/0278198 A1    Sep. 3, 2020

(30) Foreign Application Priority Data

Nov. 27, 2017  (IT) .................. 102017000135974

(51) Int. Cl.
*G01B 11/275*    (2006.01)
(52) U.S. Cl.
CPC .... *G01B 11/2755* (2013.01); *G01B 2210/146* (2013.01); *G01B 2210/286* (2013.01)

(58) Field of Classification Search
CPC .......... G01B 11/2755; G01B 2210/146; G01B 2210/286
See application file for complete search history.

(56) References Cited

U.S. PATENT DOCUMENTS

| | | |
|---|---|---|
| 6,404,486 B1 | 6/2002 | Nobis et al. |
| 6,658,749 B2 | 12/2003 | Jackson et al. |
| 8,096,057 B2 | 1/2012 | Schommer et al. |
| 8,136,259 B2 * | 3/2012 | Torri ............... G01B 11/275 356/139.09 |
| 8,418,543 B2 | 4/2013 | Tentrup et al. |
| 8,522,609 B2 | 9/2013 | Nobis et al. |
| 8,836,764 B2 | 9/2014 | Gruetzmann et al. |

(Continued)

*Primary Examiner* — Yaritza Guadalupe-McCall
(74) *Attorney, Agent, or Firm* — Duane Morris LLP; Gregory M. Lefkowitz

(57) ABSTRACT

A method for measuring the dimensions and characteristic angles of wheels, steering system and chassis of vehicles by means of an apparatus comprising a plurality of 3D scanners, functionally connected to a computer and arranged peripherally to a vehicle whose dimensions and characteristic angles of wheels, steering system and chassis are to be measured; each one of the 3D scanners having a viewing field, the merging of the viewing fields defining a viewing field of the apparatus; the method is characterized in that it comprises: a total measurement step, in which all the wheels of the vehicle are at least partially visible in the viewing field of the apparatus; and a partial measurement step, in which at least one wheel of the vehicle is not visible in the viewing field of the apparatus.

8 Claims, 4 Drawing Sheets

(56) References Cited

U.S. PATENT DOCUMENTS

| | | |
|---|---|---|
| 9,127,937 B2 | 9/2015 | Nobis et al. |
| 9,633,143 B2 * | 4/2017 | Carrasco ................. G06F 30/15 |
| 9,791,268 B2 * | 10/2017 | Buzzi ................. G01B 11/2755 |
| 10,175,360 B2 * | 1/2019 | Zweigle ................. G01S 17/42 |
| 10,241,195 B1 * | 3/2019 | Stieff ................. G01M 17/007 |
| 10,318,822 B2 * | 6/2019 | Gao ......................... G08G 1/16 |
| 10,551,180 B2 * | 2/2020 | Oki ....................... G01B 11/275 |
| 10,612,914 B2 * | 4/2020 | Torri ..................... G01S 7/4815 |
| 2005/0030525 A1 | 2/2005 | Forster |
| 2009/0216484 A1 | 8/2009 | Schommer |
| 2012/0026293 A1 | 2/2012 | Gruetzmann |
| 2014/0219509 A1 * | 8/2014 | Buzzi ................. G01B 11/2755 |
| | | 382/104 |
| 2018/0180411 A1 * | 6/2018 | Torri ................. G01B 11/2755 |
| 2020/0278198 A1 * | 9/2020 | Torri ................. G01B 11/2755 |

* cited by examiner

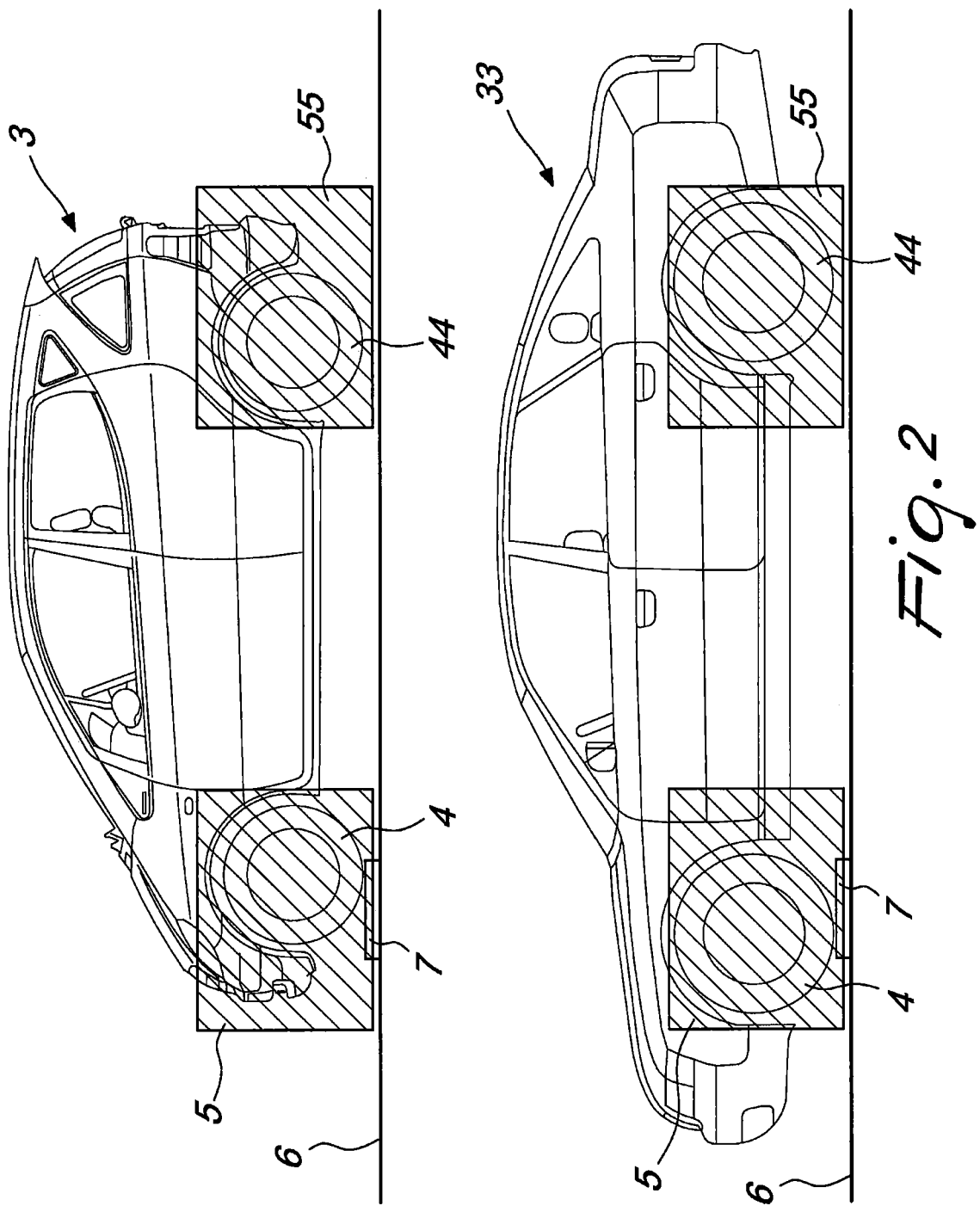

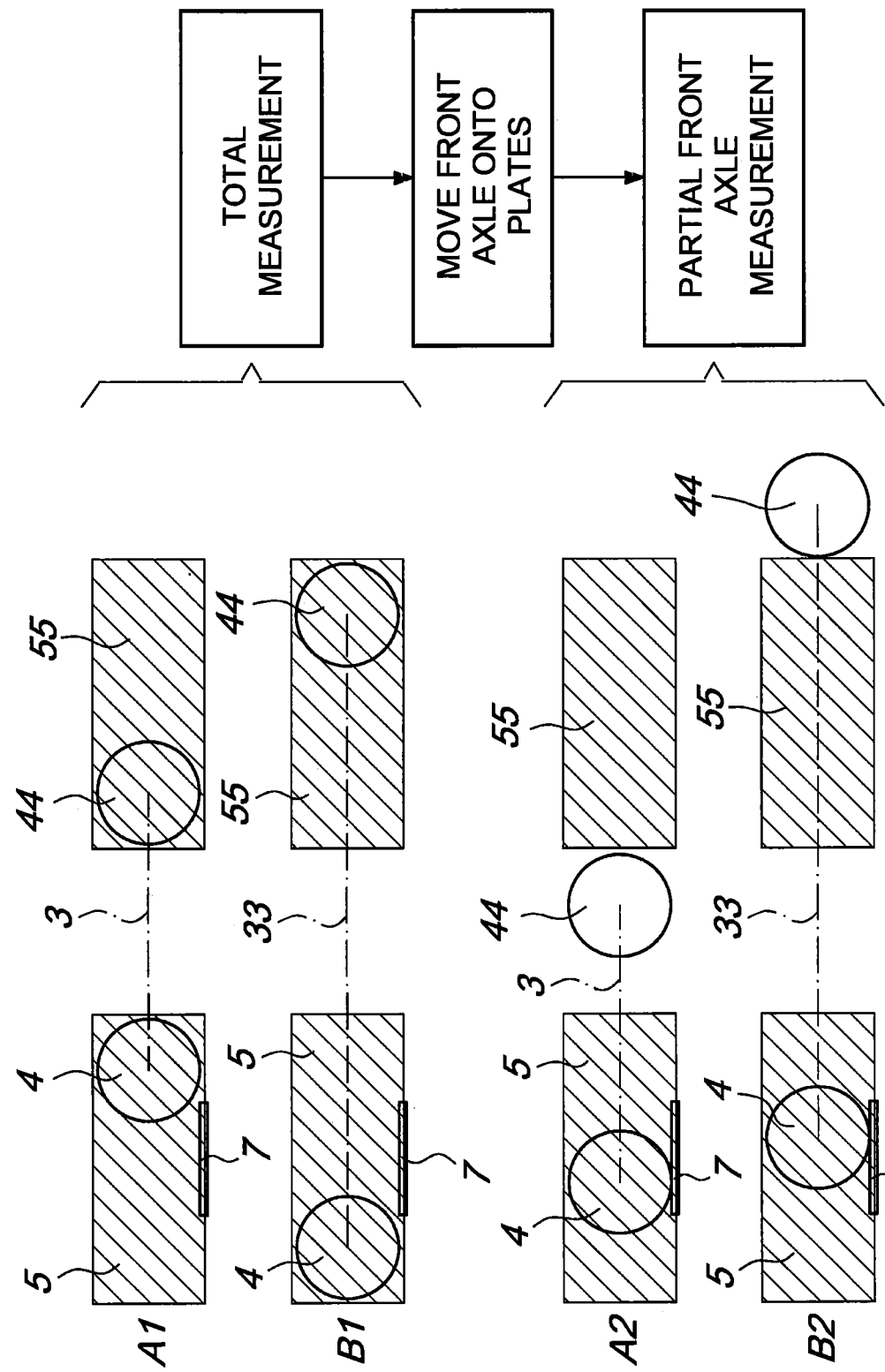

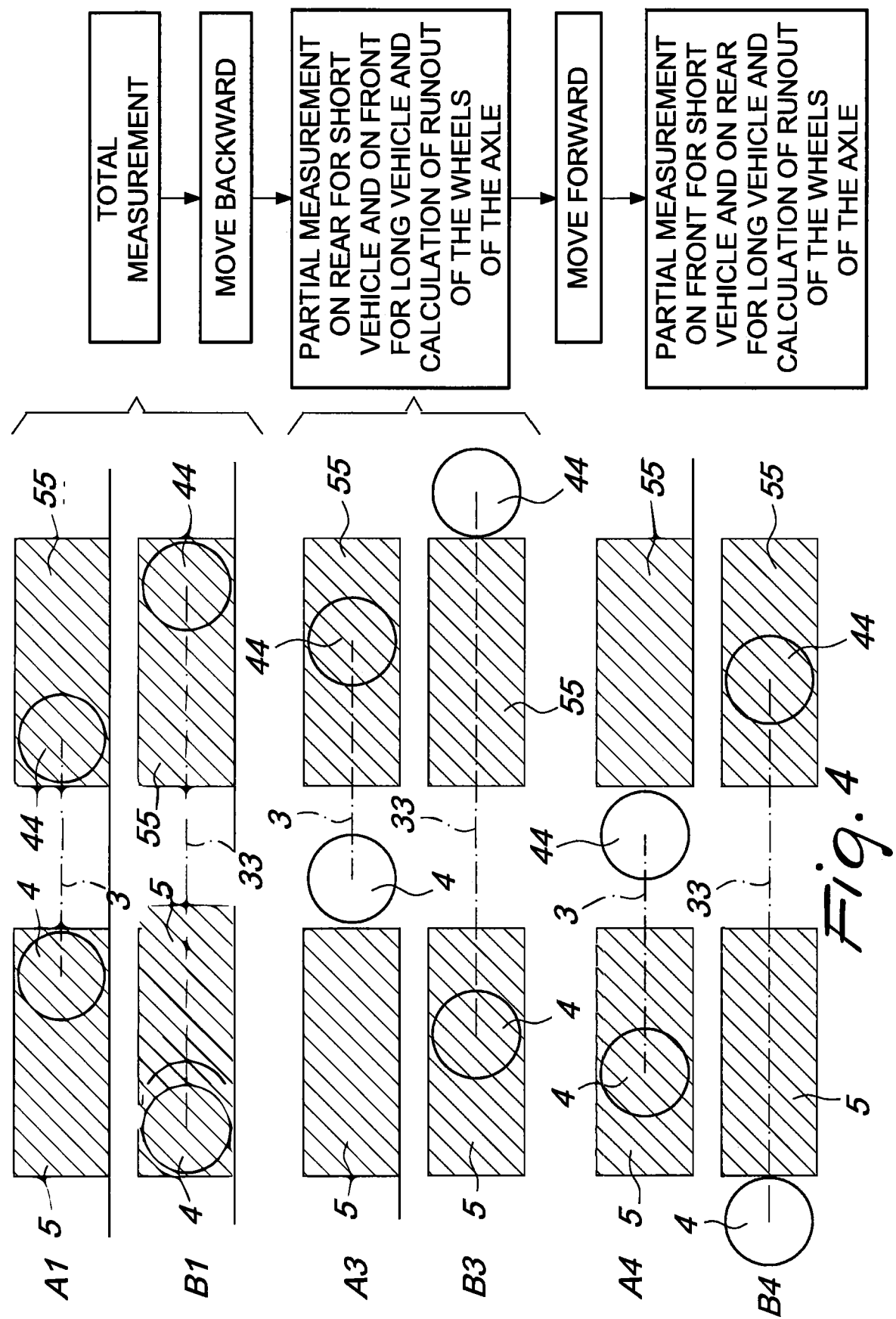

METHOD AND APPARATUS FOR MEASURING THE DIMENSIONS AND CHARACTERISTIC ANGLES OF WHEELS, STEERING SYSTEM AND CHASSIS OF VEHICLES

CROSS-REFERENCE TO RELATED APPLICATIONS

This application is a § 371 national stage entry of International Application No. PCT/EP2018/082509, filed Nov. 26, 2018, which claims priority of Italian National Application No. 102017000135974, filed Nov. 27, 2017, the entire contents of which are incorporated herein by reference.

The present invention relates to a method and apparatus for wheel alignment, i.e., adapted to measure and support the adjustment of the geometry of the wheels, steering system and chassis of vehicles.

More particularly, the present invention relates to a method and an apparatus for contactless wheel alignment, i.e. adapted to measure by means of three-dimensional optical readers, hereinafter 3D scanners, devices for measuring the three-dimensional geometry of objects that are visible in their viewing field, without physical contact between the device and the object, in this case the wheels or parts of the chassis of the vehicle.

Even more particularly, the present invention relates to a method and to an apparatus for total contactless wheel alignment, i.e., with scanners configured so that if the viewing field of the apparatus is defined as the merging of the viewing fields of the scanners, there is a position of the vehicle in which all the wheels of the vehicle are at least partially visible in the viewing field of the apparatus, so that all the wheels can be measured simultaneously or, in equivalent terms, it is possible to perform a total measurement of the vehicle.

An apparatus for total contactless wheel alignment is described for example in international patent application WO2013/041252.

US2009/216484 discloses a method for the relative positioning of a vehicle to be measured with respect to a measuring device, wherein the vehicle to be measured is detected by the measuring device and the position of the vehicle to be measured with respect to the measuring device is ascertained. Then a return message signal is generated which indicates whether the vehicle to be measured is located in a position that is suitable for taking the measurement or not.

Since the alignment procedure can include steps in which the vehicle is moved with respect to its support, it may be necessary to measure it in different positions.

In the prior art total contactless wheel alignment apparatuses, all those measurement positions are total measurement positions and therefore there is the problem of how to keep the wheels at least partially within the viewing field of the apparatus for all of the positions.

This can be solved in various manners, each of which entails however objective problems:

increasing the viewing field of the scanners, by adopting further wide-angle lens systems, which entails the objective problem of worsening measurement precision, as a consequence of the increase in the viewing angle of the wheels and the aberration of the lens system;

increasing the viewing field of the scanners, by increasing the distance between the scanners and the vehicle, which entails the objective problem of increasing the complexity and costs of the video cameras of the scanners in order to allow to view distant wheels with resolution, and increasing the lateral space occupation of the apparatus with the possibility of interference with parts of the building or other machines, reducing the applicability of the apparatus;

adding further scanners to the apparatus, which entails the objective problem of increasing the costs of the apparatus and the complexity of the calibration device of the scanners, i.e., of the device required to place in a common reference system the measurements of the individual scanners, each performed in an own reference system of the scanner itself;

moving the scanners with respect to the support of the vehicle during the step of movement of the vehicle in order to follow it, which entails the objective problem of increasing the cost and complexity of the mechanical system due to the need for guiding systems and automation systems, creating safety problems due to moving parts, and increasing the cost and complexity of the calibration device of the scanners due to the need to work during movement, during which the mutual position of the scanners cannot be assumed to be invariant.

In fact, since during the movement the vehicle prevents the scanners on one side of the vehicle from viewing the other scanners on the other side, it is not possible to adopt a simplified calibration device that utilizes the scanners themselves during the absence of the vehicle, but it is necessary to add additional video cameras which are located in order to operate even in the presence of the vehicle.

The aim of the present invention is to provide a method and an apparatus for total contactless wheel alignment that overcome the drawbacks of the cited prior art: measurement imprecision, lateral space occupation, lack of safety for the operator, complexity and cost of the video cameras of the scanners, of the mechanical system and of the calibration device.

This aim is achieved by a method for measuring the dimensions and characteristic angles of the wheels, steering system and chassis of vehicles by means of an apparatus comprising a plurality of 3D scanners, functionally connected to a computer and arranged peripherally to a vehicle whose dimensions and characteristic angles of the wheels, steering system and chassis are to be measured; each one of said 3D scanners having a viewing field, the merging of said viewing fields defining a viewing field of the apparatus;
said method comprising:
a total measurement step, in which all the wheels of the vehicle are at least partially visible in the viewing field of the apparatus;
and a partial measurement step, in which at least one wheel of the vehicle is not visible in the viewing field of the apparatus;
said method being characterized in that said 3D scanners are fixed with respect to themselves and to a support of the vehicle, between said total measurement step and said partial measurement step.

The above aim and objects of the invention are also achieved by an apparatus for measuring the dimensions and characteristic angles of the wheels, steering system and chassis of vehicles, comprising a plurality of 3D scanners, functionally connected to a computer; each one of said 3D scanners having a viewing field, the merging of said viewing fields defining a viewing field of the apparatus; said 3D scanners being arranged peripherally to a vehicle being measured so that all the wheels of said vehicle are at least partially visible in the viewing field of the apparatus, when said vehicle is in a total measurement position; said computer and said 3D scanners being configured to perform a measurement when all the wheels of the vehicle are at least partially visible in the viewing field of the apparatus and a measurement when the vehicle is in a partial measurement position in which at least one wheel is not visible in the viewing field of the apparatus;

said apparatus being characterized in that said 3D scanners are fixed with respect to each other and to a support of the vehicle, between said total measurement step and said partial measurement step.

Further characteristics and advantages will become better apparent from the description of preferred but not exclusive embodiments of the invention, illustrated by way of non-limiting example in the accompanying drawings, wherein:

FIG. 2 is a schematic side view of the apparatus during the total measurement step of two vehicles of different length;

FIG. 3 is a schematic diagram of the total measurement step and of the partial measurement step following the backward movement of the vehicle in order to place the front wheels on the plates for the execution of the step of steering or adjustment of the front wheels, for two vehicles of different length;

FIG. 4 is a schematic diagram of the total measurement step and of the two partial measurement steps with the vehicle moved forward and backward in order to perform the runout step, for two vehicles of different length.

Figure 1:
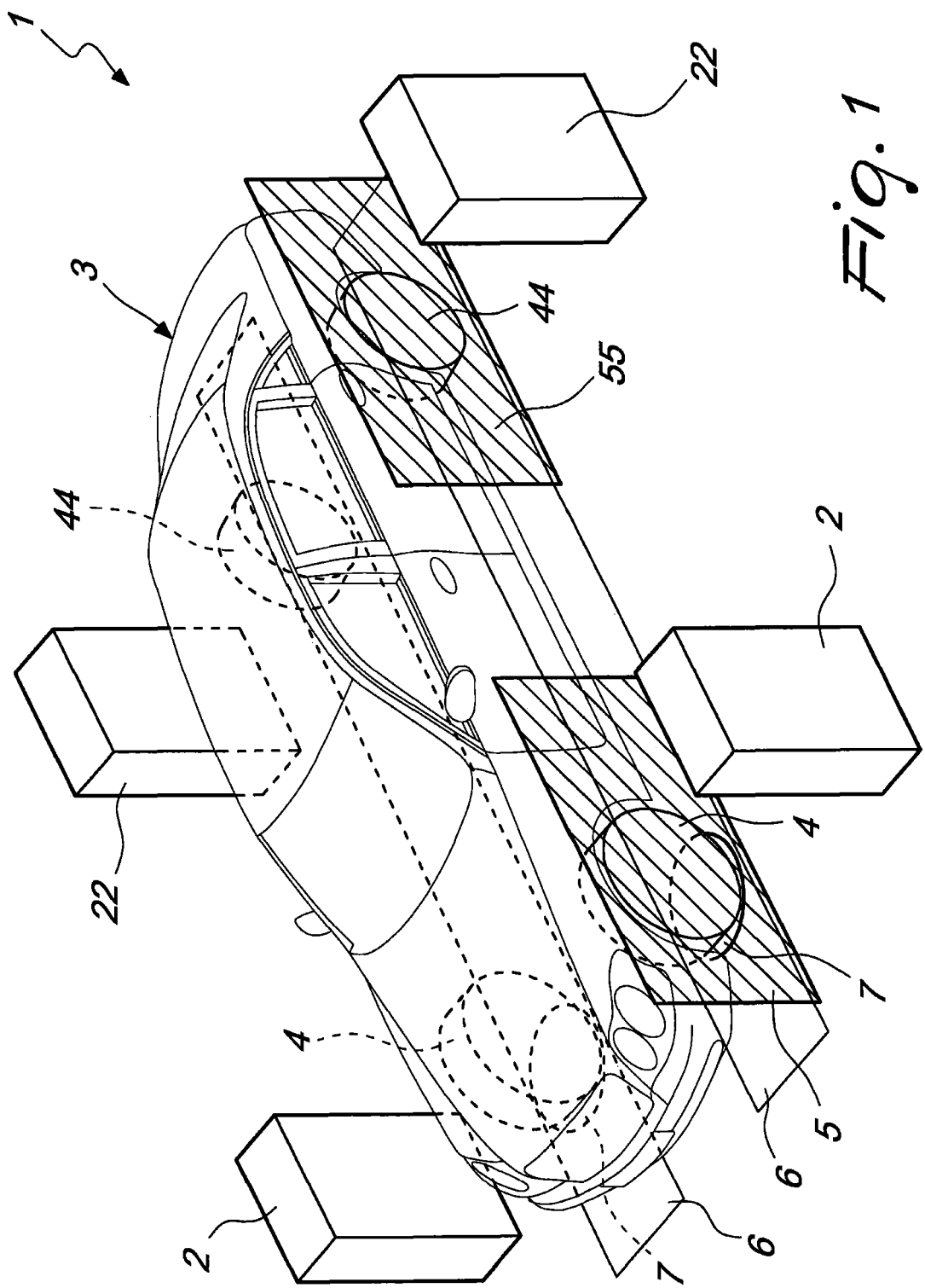
FIG. 1 is a schematic axonometric view of the apparatus according to the present invention during a total measurement step.

With reference to the cited figures, the measurement apparatus according to the invention, globally designated by the reference numeral 1, includes a plurality of 3D scanners 2, 22, which are functionally connected to a computer and are arranged peripherally to a vehicle 3, 33 whose dimensions and angles of wheels, steering system and chassis are to be measured.

The 3D scanners 2, 22 are arranged in pairs: a pair of front readers 2 and a pair of rear readers 22, which respectively correspond to the region of the front wheels 4 and to the region of the rear wheels 44 of the vehicle 3, 33 being measured.

Each reader has a viewing field, schematically shown in the figures as a rectangle drawn in dashed lines: the viewing field of the front readers 2 is designated by the reference numeral 5 and the viewing field of the rear readers 22 is designated by the reference numeral 55.

For the purposes of the present patent application, the viewing field of a 3D scanner is defined as the volume of space in which the reader is capable of performing a three-dimensional reconstruction of an object.

An object is defined as visible in a viewing field if it is included in the viewing field and without other objects which, by casting shadows, prevent its three-dimensional reconstruction.

The viewing field 5, 55 of the scanners 2, 22 is wide enough to allow the apparatus to frame simultaneously, with the four scanners, both the front wheels 4 and the rear wheels 44 of a vehicle 3, 33 regardless of the wheelbase between the front and rear wheels of the vehicle, for the three-dimensional acquisition of an image of each wheel 4, 44.

FIG. 2 is a view of an example of use of the apparatus 1 for a short wheelbase vehicle 3 and for a long wheelbase vehicle 33.

The scanners 2, 22 are arranged around a vehicle support, which is constituted by a pair of platforms 6, each of which has a rotating plate 7.

In the preferred embodiment, the scanners 2, 22 are advantageously of the stereo type with structured light projection, in which each scanner includes two video cameras and a projector. By means of triangulation algorithms of a known type, it is possible to reconstruct from the images the three-dimensional geometry of the object.

In the preferred embodiment, the calibration device of the scanners is provided by the video cameras of the scanners themselves, without additional video cameras, at least one video camera of each scanner 2, 22 being arranged in such a manner as to frame directly at least one fixed target of another scanner 2, 22 in the absence of the vehicle. The calibration device calculates the combined rotations and translations between the reference systems of the scanners in an initial step of calibration of the scanners in the absence of the vehicle, in which at least one of the video cameras acquires images of the fixed targets of the other scanners; and the combined rotations and translations are assumed to be unchanged throughout the vehicle measurement procedure.

In the preferred embodiment, the measurement apparatus 1 includes, for each axle of the vehicle 3, 33, a pair of scanners 2, 22 which are arranged so as to be mutually opposite, with respect to the vehicle 3, 33, substantially along the axis of the vehicle, in such a manner that each one frames a wheel 4, 44 of each axle of the vehicle and in such a manner that each one frames, in the absence of the vehicle 3, 33, one or more fixed targets that belong to the scanners 2, 22 arranged on the opposite side of the vehicle 3, 33 with respect to the scanner 2, 22 being considered, in particular at least the fixed target that belongs to the scanner 2, 22 arranged along the same axis.

In the preferred embodiment, the scanners 2, 22 are arranged in fixed positions with respect to each other and are not moved for the measurement operations.

In the preferred embodiment, during the total measurement step, the vehicle 3, 33 is arranged in such a position that each wheel 4, 44 is in the viewing field 5, 55 of the respective scanner 2, 22. This step is shown schematically in FIG. 2, which shows in an upper region the measurement of a vehicle 3 with a short wheelbase and shows in a lower region the measurement of a vehicle 33 with a long wheelbase.

According to the present invention, the steps of the alignment procedure in which the vehicle is moved with respect to its support 6 can be partial measurement steps in which at least one wheel of the vehicle is not visible in the viewing field of the apparatus.

One step of movement of the vehicle with respect to its support is the steering step, in which the vehicle is moved in order to place the front wheels on rotating plates to be then steered.

FIG. 3 shows in sequence:

the total measurement step for two vehicles respectively with a short wheelbase 3 (A1) and with a long wheelbase 33 (B1);

the steering step for the same vehicles with a short wheelbase 3 (A2) and with long wheelbase 33 (B2), in which the front wheels 4 are moved onto the rotating plates 7 and are visible in the viewing field of the apparatus while the rear wheels are not visible in the viewing field of the apparatus and is therefore a partial measurement step.

Another step of movement of the vehicle with respect to its support is the runout step, in which the vehicle is moved to acquire measurements at different angles of rotation of the wheels and therefore calculate the direction of the axis of rotation of each wheel.

FIG. 4 shows in sequence:

the total measurement step for two vehicles respectively with a short wheelbase 3 (A1) and with a long wheelbase 33 (B1);

the backward runout step of the vehicle in which, for a long wheelbase vehicle 33 the front wheels are visible in the viewing field of the apparatus while the rear wheels are not visible in the viewing field of the apparatus (B3), and vice versa for a short wheelbase vehicle 3 (A3); the step including a partial measurement of the front wheels of a long wheelbase vehicle or a partial measurement of the rear wheels of a short wheelbase vehicle;

the forward runout step of the vehicle in which, for a long wheelbase vehicle 33, the front wheels are not visible in the viewing field of the apparatus while the rear wheels are visible in the viewing field of the apparatus (B4), and vice versa for a short wheelbase vehicle 3 (A4); the step includes a partial measurement of the rear wheels of a long wheelbase vehicle or a partial measurement of the front wheels of a short wheelbase vehicle.

Another step of movement of the vehicle with respect to its support is the adjustment step in which the vehicle 3, 33 is moved, in order to center it, on a lift table, not visible in the figures, for adjustment while the wheels are raised or to arrange the front wheels 4 on the plates 7 for front adjustment or to position the rear wheels 44 on movable platforms, not shown in the figures, for the adjustment of the rear wheels, where the adjustment step is a partial measurement step in which the wheels of one axle of the vehicle are visible in the viewing field of the apparatus while the wheels of the other axle are not visible in the viewing field of the apparatus.

Another step of movement of the vehicle with respect to its support is the step of alignment of the panel for the calibration of the sensors of the vehicle, in which the vehicle is moved backward in order to adjust the distance between the vehicle and the panel.

The panel alignment step is a partial measurement step in which the wheels of one axle of the vehicle are visible in the viewing field of the apparatus while the wheels of the other axle are not visible in the viewing field of the apparatus.

The apparatus and the method for measurement of the dimensions and characteristic angles of the wheels, steering system and chassis of vehicles, according to the present invention, are distinguished from the systems of the background art owing to the fact that they include, in addition to the total measurement step, in which all the wheels of the vehicle are at least partially visible in the viewing field of the apparatus, at least one partial measurement step, in which at least one wheel of the vehicle is not visible in the viewing field of the apparatus.

The possibility of execution of a partial measurement allows to avoids the need to move the scanners and/or to increase the viewing field of the scanners and/or to add scanners, in order to ensure that all the wheels remain visible, as is instead necessary in the systems of the prior art.

In practice it has been found that the invention achieves the intended aim and objects, providing an apparatus and a method for measuring the dimensions and characteristic angles of the wheels, steering system and chassis of vehicles which allow to solve the objective problems of the systems of the prior art.

The present invention solves the problem constituted by the mechanical complexity of traditional apparatuses, which is due to the need to move the scanners in order to follow the vehicle.

The apparatus according to the present invention allows to avoid the use of additional devices that allow measurement and calibration even in the presence of an obstruction to view caused by the vehicle.

According to the present invention, the scanners are fixed and since they are not moved the mechanical system is simplified.

The calibration device can avoid measuring in the presence of the vehicle because the calibration taken when the vehicle is absent remains unchanged while the vehicle is present and therefore, since the vehicle does not obstruct during calibration the line of sight between one scanner and the ones that face it, it is possible to use the video cameras of the scanners for measuring targets that are integral with the other scanners.

Therefore, additional video cameras are not necessary, differently from prior art systems, such as for example WO2013/041252.

Another advantage offered by the present invention is constituted by the fact that the apparatus can be installed in sites where lateral space is limited, for example by the presence of the structure of the building or other machines, because it is not necessary to move the scanners in order to increase their viewing field.

A further advantage of the present invention is constituted by the fact that the apparatus has a lower cost than the prior art machines, which necessarily must be provided with additional systems for calibration and movement of the scanners.

Possible alternative embodiments of the invention may be characterized by:

use of other types of scanner that are commercially available: time of flight cameras, without projection, with single video camera and projector, or others;

a scanner calibration device provided with video cameras that are different from the ones of the scanners;

scanners arranged differently around the vehicle and in a different number;

in the total measurement step, wheels only partially within the viewing field of the apparatus.

The materials used, as well as the dimensions, may of course be any according to the requirements and the state of the art.

This application claims the priority of Italian Patent Application No. 102017000135974 filed on Nov. 27, 2017, the subject matter of which is incorporated herein by reference.

The invention claimed is:

1. A method for measuring the dimensions and characteristic angles of the wheels, steering system and chassis of vehicles by means of an apparatus comprising a plurality of 3D scanners, functionally connected to a computer and arranged peripherally to a vehicle whose dimensions and characteristic angles of the wheels, steering system and chassis are to be measured; each one of said 3D scanners having a viewing field, the merging of said viewing fields defining a viewing field of the apparatus; said method comprising:

a total measurement step, in which all the wheels of the vehicle are at least partially visible in the viewing field of the apparatus;

and a partial measurement step, in which at least one wheel of the vehicle is not visible in the viewing field of the apparatus; said method being wherein said 3D scanners are fixed with respect to themselves and to a support of the vehicle, between said total measurement step and said partial measurement step.

2. The method according to claim 1, comprising a partial measurement step in which both wheels of a same axle of the vehicle are not visible in the viewing field of the apparatus.

3. The method according to claim 1, comprising a steering step, in which the vehicle is moved in order to place the front wheels on rotating plates of a support of said vehicle and steered at different steering angles; wherein said steering step is a partial measurement step in which the front wheels of the vehicle are visible in the viewing field of the apparatus while the rear wheels are not visible in the viewing field of the apparatus.

4. The method according to claim 1, comprising a runout step in which the vehicle is moved in order to acquire measurements at different rotation angles of the wheels in order to calculate the direction of the rotation axis of each wheel; said runout step comprising the steps of:
- backward motion of the vehicle, a partial measurement step in which, for a long wheelbase vehicle, the front wheels are visible in the viewing field of the apparatus while the rear wheels are not visible in the viewing field of the apparatus, and vice versa for a short wheelbase vehicle; said step comprising a partial measurement of the front wheels of a long wheelbase vehicle or a partial measurement of the rear wheels of a short wheelbase vehicle;
- forward motion of the vehicle, a partial measurement step in which, for a long wheelbase vehicle, the front wheels are not visible in the viewing field of the apparatus while the rear wheels are visible in the viewing field of the apparatus, and vice versa for a short wheelbase vehicle; said step comprising a partial measurement of the rear wheels of a long wheelbase vehicle, or a partial measurement of the front wheels of a short wheelbase vehicle.

5. The method according to claim 1, comprising an adjustment step in which the vehicle is moved, in order to center it on a lift table for adjustment with raised wheels, or to arrange the front wheels on rotating plates for adjustment of the front wheels, or to arrange the rear wheels on movable platforms for adjustment of the rear wheels, wherein said adjustment step is a partial measurement step in which the wheels of one axle of the vehicle are visible in the viewing field of the apparatus while the wheels of the other axle are not visible in the viewing field of the apparatus.

6. The method according to claim 1, comprising a step of alignment of a panel for the calibration of the sensors of the vehicle, in which the vehicle is moved backward in order to adjust the distance between the vehicle and the panel, wherein said panel alignment step is a partial measurement step in which the wheels of an axle of the vehicle are visible in the viewing field of the apparatus while the wheels of the other axle are not visible in the viewing field of the apparatus.

7. An apparatus for measuring the dimensions and characteristic angles of the wheels, steering system and chassis of vehicles, comprising a plurality of 3D scanners, functionally connected to a computer; each one of said 3D scanners having a viewing field, the merging of said viewing fields defining a viewing field of the apparatus; said 3D scanners being arranged peripherally to a vehicle being measured so that all the wheels of said vehicle are at least partially visible in the viewing field of the apparatus, when said vehicle is in a total measurement position; said computer and said 3D scanners being configured to perform a measurement when all the wheels of the vehicle are at least partially visible in the viewing field of the apparatus and a measurement when the vehicle is in a partial measurement position in which at least one wheel is not visible in the viewing field of the apparatus; said apparatus being wherein said 3D scanners are fixed with respect to each other and to a support of the vehicle, between said total measurement step and said partial measurement step.

8. The apparatus according to claim 7, comprising, for each axle of the vehicle, a pair of 3D scanners which are arranged mutually opposite, with respect to the vehicle, substantially along the axis of the vehicle, so that in the presence of the vehicle each wheel of the vehicle is visible in the viewing field of the 3D scanner and so that in the absence of the vehicle both fixed targets that belong to the 3D scanners arranged on the opposite side of the vehicle with respect to said 3D scanner being considered are visible in the viewing field of said 3D scanner.

\* \* \* \* \*